Sept. 20, 1971 B. T. CHAO ET AL 3,605,426
DESALINATION PROCESS BY CONTROLLED FREEZING
Filed Nov. 27, 1968 2 Sheets-Sheet 1

INVENTORS
Bei T. Chao
Edward J. Tanzow
BY Merriam, Marshall, Shapiro & Klose
ATTORNEYS

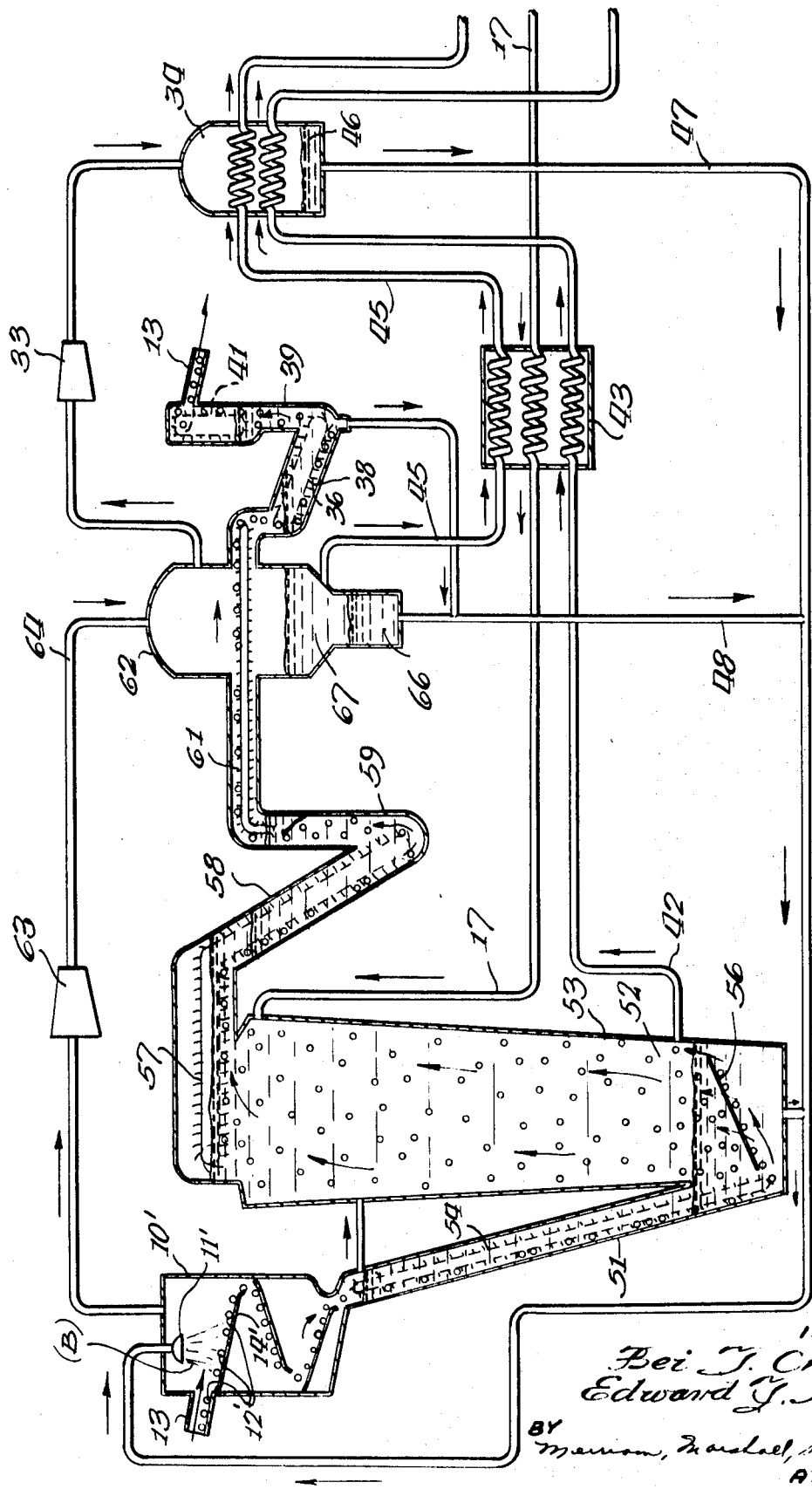

3,605,426
DESALINATION PROCESS BY CONTROLLED FREEZING

Bei T. Chao, 704 Brighton Drive, and Edward F. Janzow, 1108 N. Lincoln, both of Urbana, Ill. 61801
Filed Nov. 27, 1968, Ser. No. 779,430
Int. Cl. B01d 9/04
U.S. Cl. 62—58
8 Claims

ABSTRACT OF THE DISCLOSURE

A process for recovery of fresh water from brine by formation of ice on the surface of chilled hollow pellets containing a liquid which is at least partially frozen and melts at a temperature below the freezing point of water. The heat of fusion of the frozen liquid absorbs the heat of crystallization evolved in the formation of said ice and provides the pellets with high effective heat capacity and high thermal efficiency. After separation of the ice covered pellets from the brine, the ice is melted and recovered as the product water.

---

Figure 1:
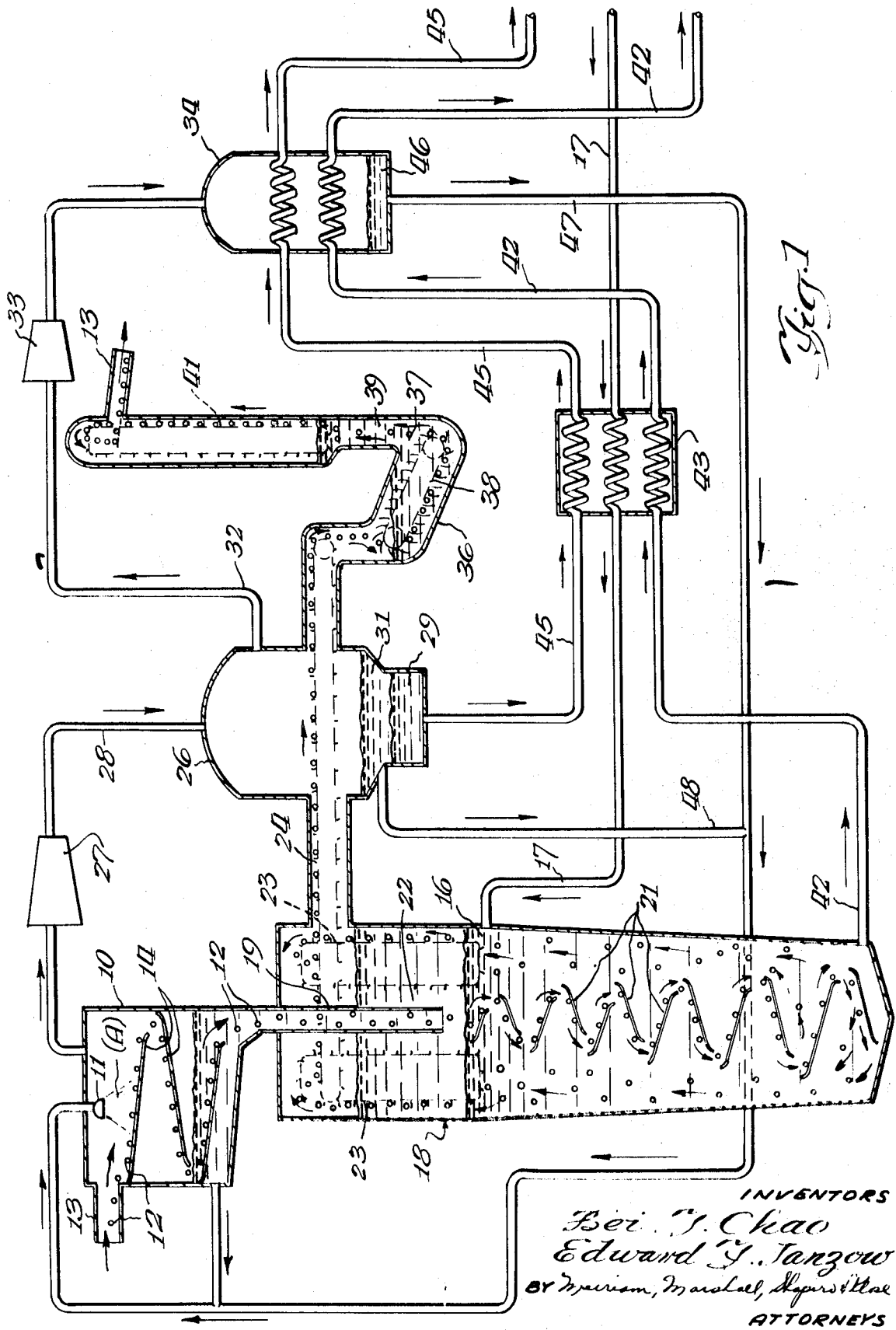

This invention relates to a process for recovering fresh water from brine by controlled freezing. More particularly, the process involves the controlled formation of ice at the surface of chilled hollow pellets containing a frozen liquid, removal of the ice-coated pellets from the brine, and recovery of the ice as the product water.

Several processes have been proposed for the recovery of fresh water from brines by freezing of the brine to produce relatively pure ice crystals which are then removed from the brine and which constitute the desired product. In general, these processes have presented two problems: first, difficulty in achieving a clean separation of ice from the ice/brine mixture or second, inefficiency in the process resulting from the necessity for handling large quantities of solid materials for each unit of fresh water produced.

The process of the present invention contemplates a controlled freezing process using chilled pellets, on the surface of which ice is formed. The pellets, made of a suitable heat conducting material, are hollow and contain a liquid having a large latent heat (i.e., a high heat of fusion) which freezes at a suitably low temperature below the freezing point of the brine. These pellets, initially cooled to a temperature such that at least part, and preferably all, of the liquid contained therein is frozen are brought into contact with the brine, the cooling effect of the frozen interior causing the formation of a layer of ice on the surface of each pellet. The pellets thus serve simultaneously as nucleation sites and carriers of ice crystals. The high effective heat capacity of the liquid contained within the pellets enable them to absorb large amounts of heat with only small changes in temperature. The process therefore involves primarily latent heat transport, thus minimizing thermodynamic irreversibilities and greatly increasing the thermal efficiency of the process over those heretofore known.

Another advantage of the present process stems from the hollow construction of the pellets which permits control of the overall density thereof. By suitably selecting the liquid to be used, and the size and the percentage of fill in the pellets, the overall density of the pellets can be adjusted so that they tend to remain in motion under the influence of gravity and natural buoyant forces when in contact with the main body of brine. For example, by making the pellets slightly denser than the brine, the pellets will initially start to sink slowly. As a layer of ice builds on the surface of the pellets, they become less dense and ultimately lighter than the brine so as to float on the surface thereof, thereby aiding recovery thereof. In addition, the practically continuous motion of the pellets, relative to the surrounding brine, not only prevents the build-up of salt concentration in the brine film adjacent each pellet as the water freezes out, but also greatly reduces the likelihood of forming clusters of ice-coated pellets which might entrain pockets of brine which would contaminate the product water.

The process will be better understood from the following detailed description thereof taken in conjunction with the accompanying drawings, in which:

FIG. 1 is a schematic description of one embodiment of the process of the invention, in which the necessary refrigeration is obtained by direct contact with a liquid refrigerant (A) having a specific gravity less than that of water, and FIG. 2 is a schematic diagram of a similar process in which the refrigerant (B) is a liquid heavier than water.

Referring to FIG. 1, a volatile liquid refrigerant A is pumped into evaporation chamber 10 through a system of nozzles, e.g., 11, each of which directs a jet of mist towards hollow, liquid-containing pellets 12 introduced into evaporation chamber 10 through entry conduit 13. A portion of the refrigerant vaporizes on contact with the pellets, removing heat and reducing the temperature of the pellets to a point below the freezing point of the reject brine, and suitably within the range of about 18–27° F. The temperature achieved is sufficiently low to freeze the liquid contained within the pellets. It is preferred for maximum efficiency that the liquid in the pellets be entirely frozen, although partial freezing can obviously also be used. Pellets 12 are made to tumble down an inclined pathway 14 in order to increase the residence time in chamber 10 as necessary to permit freezing to occur. Feed brine 16, typically consisting of sea water having about 3.5% salt content, having been cooled to a suitable temperature of about 32° F., which is slightly above its freezing point, is fed through line 17 into the upper zone of freezer-separator 18. Also supplied to this zone of the freezer-separator are the frozen pellets 12 from evaporation chamber 10 entering through dip leg 19. As pellets 12 sink in brine 16, they strike a system of inclined baffles 21 used to increase the contact time with the brine and at the same time to impart rolling motion to the pellets. When pellets 12 are introduced into the body of brine 16, they have a specific gravity greater than that of the brine. Due to the growth of a layer of ice on the exterior surface, however, the overall density of the pellets continuously decreases. By the time they arrive at the lower regions of freezer-separator 18, pellets 12 have become essentially neutrally buoyant in the slowly downwardly moving brine 16. Further build-up of the ice coating on pellets 12 decreases their density still further and causes them to start rising in the brine.

Throughout the ice-covered pellets' upward journey, their velocity is governed by the rate of ice formation and the speed in which brine 16 is displaced downwardly in the freezer-separator. The physical factors involved in this operation, i.e., temperatures, heat and mass transfer rates, etc., are correlated so that the ice-laden pellets 12 preferably reach the topmost region of brine 16 before they are thermally exhausted. Floating on the body of brine 16 in freezer-separator 18 is a pool 22 of liquid refrigerant A. The ice-coated pellets are mechanically lifted by lifters 23 through this pool, thus sweeping from the surface of the pellets any brine adhereing thereto, and then transfered to a conveyor 24 which transports them into melter condenser 26.

The vapor of refrigerant A released in evaporation chamber 10 is directed to main compressor 27 where it is compressed and supplied via line 28 to melter-condenser 26. The compressed refrigerant vapor supplied through line 28 condenses at a temperature sufficiently high to melt the ice on the pellets 12 on making direct contact. The water thereby produced collects as a pool 29 in the bottom of melter-condenser 26 with a layer of condensed refrigerant 31 floating thereon. Any refrigerant vapor not condensed by contact with the ice is led via line 32 to auxiliary compressor 33 and auxiliary condenser 34 for reuse as needed.

Pellets 12, after being stripped of ice in melter-condenser 26, are dropped into well 36 containing brine 37 which has a specific gravity higher than that of the bare pellets, so that the pellets so that the pellets float therein. Inverted conveyor 38 having perforated buckets catches and transports the pellets to the bottom of standpipe 39 where the pellets are released and escape upwardly as a result of their inherent buoyancy. At the surface of the brine, they are further lifted by mechanical elevator 41 and are returned by conduit 13 to evaporation chamber 10 for the next cycle of operation.

Product water, which collects in a pool 29 at the base of melter-condenser 26, and the reject brine, which leaves the base of freezer-separator 18, are passed through lines 45 and 42 respectively through heat exchanger 43, in which the input brine entering through line 17 is cooled to a temperature slightly above its freezing point, as previously described. The reject brine stream and product water still have residual cooling capability after leaving heat exchanger 43, which is utilized in auxiliary condenser 34 to condense the vapors released in melter-condenser 26, after compression by auxiliary compressor 33. A pool of condensed refrigerant 46 collects at the base of auxiliary condenser 34, which is led by conduit 47 to a junction with line 48 transporting similar liquid refrigerant which collects in the base of melter-condenser 26. The combined refrigerant stream is used to freeze the pellets in evaporation chamber 12 as previously described.

In the heat exchange cycle, all of the heat gained by the pellets in freezer-separator 18 and in melter-condenser 26 must be removed in evaporation chamber 10. Only the former, however, serves the useful purpose of producing ice. Thus, the pellet thermal efficiency for the heating and cooling cycle can be expressed by the ratio of the heat absorbed by the pellets in the freezer-separator 18 to the total heat transfer during the cycle. Expressed on this basis and assuming that the pellets comprise about 72% by weight of a liquid (e.g., a eutectic solution of potassium nitrate and water) having a heat of fusion of about 143 B.t.u./lb. and 28% of aluminum having a specific heat of 0.21 B.t.u./lb. and further assuming an increase in temperature of 2.1° F. in freezer-separator 18 and 4.2° F. in the melter-condenser 26, the thermal efficiency of the pelllet cycle approximates 98%. For comparison, if the pellets are made of solid aluminum, the cycle efficiency drops to about 33%. The efficiency of the present process is thus extremely high by reason of the high heat capacity of the pellets. This high effective heat capacity also has the advantage that only a small mass of pellets need be cycled through the system for each pound of fresh water produced.

The liquid refrigerant used in the process of FIG. 1, described above, is assumed to have a density less than that of water. Any liquid refrigerant used in direct contact with the product water as shown in FIG. 1 should be non-toxic and immiscible with water. Commercial refrigerants which fall within this category and which could be used in the process of FIG. 1, include n-butane, isobutane, and mixtures thereof. Other suitable liquid refrigerants will be apparent to those skilled in the art.

The process depicted in FIG. 2 is generally similar to that of FIG. 1, with the exception that the refrigerant used has a density higher than that of brine, so that several changes are necessary in the mechanical handling and piping systems. A number of commercially available refrigerants, an example of which is octafluorocyclobutane, can be used in this type of operation.

Referring to FIG. 2, liquid refrigerant B is pumped into evaporation chamber 10' through nozzles 11' toward the pellets 12' which are made to tumble down inclined pathway 14' while freezing takes place in the interior thereof, as previously explained in connection with FIG. 1. On leaving evaporation chamber 10', the chilled pellets fall into well 51 which contains liquid refrigerant B at essentially the same temperature as the pellets. In this embodiment, the pellets are designed so that their apparent density is equal to or slightly less than that of the reject brine 52 at the base of freezer-separator 53. Hence, the pellets float in liquid refrigerant B which has a density substantially higher than that of the brine. Inverted conveyor 54 whose upper end protrudes above the liquid level in well 51 captures the chilled pellets 12' and moves them downwardly to the bottom region of freezer-separator 53, where the pellets are released into a pool of liquid refrigerant B. There, the pellets rise because of their natural buoyancy, striking the underside of inclined plate 56, which is provided with a number of spaced holes arranged so as to distribute the pellets approximately uniformly across the cross-section of the freezer-separator 53. In this manner, pellets 12' traverse upwardly into the slowly downwardly moving column of brine and gradually begin to accumulate a layer of ice on their surface. As the ice layer grows, the overall apparent density of pellets 12' decreases and the pellets continue to move upwardly to the top of freezer-separator 53. The speed at which the pellets travel in this manner is controlled by the rate of ice formation and the brine velocity in the freezer-separator. Preferably, the pellets should reach the surface of the brine in freezer-separator 53 before they are thermally exhausted.

At the top of freezer-separator 53 pellets 12' are caught by the perforated plates of conveyor 57 which displaces them laterally and then downwardly into an inclined well 58 containing a column of liquid refrigerant B wherein any adhered brine is displaced by the scrubbing action of the refrigerant. The displaced brine rises to the top of well 58 and returns to the freezer-separator 53. The ice-laden pellets 12' transported by conveyor 57 are released at the lower end of standpipe 59, rise to the free surface of the refrigerant B contained therein, and are then mechanically lifted and transported by conveyor 61 to melter-condenser 62 wherein the ice coating thereon is melted by contact with compressed vapors of liquid refrigerant B leaving main compressor 63 through line 64. Because of the greater density of liquid refrigerant B, it collects at the bottom of melter-condenser 62 as a pool 66 covered by a pool 67 of product water. The remainder of the process, involving heat exchange among the several flowing streams, is similar to that described for FIG. 1. The components of the process shown in FIG. 2 which are involved in this heat exchange have been identified with numerals corresponding to those used in the description of FIG. 1, which is also applicable to FIG. 2.

Although the embodiments of the process described herein use direct refrigeration, in which a refrigerant liquid and vapor come into direct contact with the pellets and the product water, it should be understood that the process is not limited thereto. Conventional indirect refrigeration systems can also be used without departing from the scope of the invention.

The material which is used to form the hollow pellets 12 and 12' for use in the process of the invention is not particularly critical, provided that it is reasonably corrosion resistant and that it has reasonably good heat-transfer properties. Metals such as stainless steel, aluminum, copper and their alloys are satisfactory materials for construction of the pellets, provided is necessary with thin corrosion-resistant surface coatings. Aluminum pellets having a diameter of about 0.5 inch and a wall thickness of 0.01 inch and having a thin corrosion-resistant coating are typical of those useful in the process. Synthetic plastic materials can also be used provided that the wall thickness is thin enough to permit good heat transfer properties.

The liquid used within the pellets may be any pure substance or a eutectic mixture of 2 or more substances which is non-toxic, freezes at a constant or nearly constant temperature in the approximate range of 18° F.–27° F. and has a large heat of fusion. It is additionally desirable that the density of the liquid be approximately equal to that of water. Examples of suitable liquids are a eutectic solution of potassium nitrate and water (11.7% potassium nitrate, freezing point 26.7° F., heat of fusion 143 B.t.u./lb.); a eutectic solution of aluminum sulfate and water (23.1% aluminum sulfate, freezing point 24.8° F., heat of fusion about 80 B.t.u./lb.); and a eutectic solution of zinc sulfate and water (27.6% zinc sulfate, freezing point 20.2° F., heat of fusion about 75 B.t.u./lb.). Other suitable materials will readily occur to those skilled in the art.

Although the process of the invention has its greatest field of application in desalinating sea water, it is not so limited. The input brine can be any aqueous solution in which sodium chloride represents a major portion of the dissolved materials, such as inland brackish waters and brines from oil wells.

The foregoing detailed description has been given for clearness of understanding only, and no unnecessary limitations should be understood therefrom, as modifications will be obvious to those skilled in the art.

What is claimed is:

1. A process for recovering fresh water from brine which comprises:
    cooling said brine to a temperature near its freezing point;
    contacting said cold brine with hollow pellets formed of a heat-conducting material, said pellets containing a liquid which freezes at a substantially constant temperature below the freezing point of said brine, said liquid-containing pellets being pre-cooled sufficiently so that said liquid is at least partially frozen;
    permitting said pellets to remain in contact with said brine until a coating of ice forms on said pellets, the latent heat evolved in said ice formation being absorbed at least in part by the heat of fusion of said at least partially frozen liquid as it is transformed from the solid to the liquid phase;
    separating the ice-coated pellets from said brine;
    melting the ice coating on said pellets and recovering the fresh water produced thereby;
    recooling the pellets and repeating the process on a cyclic basis.

2. The process of claim 1 wherein the specific gravity of said fluid-containing pellets in the ice-free state is greater than that of said brine, such that said pellets will initially sink at a predetermined rate when introduced into a body of said brine, continue to sink while a coating of ice forms thereon, and ultimately reverse their direction of travel and float when the coating of ice becomes sufficiently thick to lower the overall specific gravity of the ice-covered pellets to a value less than that of said brine.

3. The process of claim 1 wherein said pellets are pre-cooled by direct contact with a liquid refrigerant which is non-toxic and immiscible with water, the liquid contained inside said pellets being at least partially frozen by said direct contact.

4. The process of claim 1, in which a non-toxic liquid refrigerant which is immiscible with water is used to wash said ice-covered pellets free of brine prior to melting the ice layer thereon.

5. The process of claim 1 wherein said liquid is a eutectic aqueous solution, said solution having a freezing point within the range of about 18° F. to 27° F.

6. The process of claim 5 wherein said eutectic solution comprises potassium nitrate.

7. The process of claim 5 wherein said eutectic solution comprises aluminum sulfate.

8. The process of claim 5 wherein said eutectic solution comprises zinc sulfate.

References Cited
UNITED STATES PATENTS

| | | | |
|---|---|---|---|
| 2,764,488 | 9/1956 | Slattery | 62—58 |
| 3,098,735 | 7/1963 | Clark | 62—58 |
| 3,251,192 | 5/1966 | Rich et al. | 62—58 |
| 3,442,801 | 5/1969 | Anderson | 62—58 |
| 740,847 | 10/1903 | Glebsattel | 62—530 |
| 2,525,261 | 10/1950 | Henderson | 62—430 |
| 2,608,837 | 9/1952 | Leland | 62—430 |
| 2,846,421 | 8/1958 | Pollock | 62—530 |
| 3,170,778 | 2/1965 | Roth | 62—58 |
| 3,367,123 | 2/1968 | Schambra | 62—58 |
| 3,461,679 | 8/1969 | Goldberger | 62—58 |

NORMAN YUDKOFF, Primary Examiner

R. T. FOSTER, Assistant Examiner

U.S. Cl. X.R.

62—123, 430, 530